United States Patent [19]

Thiele et al.

[11] 3,760,045

[45] Sept. 18, 1973

[54] PROCESS OF PREPARING SHAPED OPTICAL BODIES USEFUL AS AIDS TO VISION

[75] Inventors: Heinrich Thiele, Kiel; Wilhelm P. Soehnges, Munich, both of Germany

[73] Assignee: said Heinrich Thiele, Kiel, Germany; by said Soehnges

[22] Filed: Dec. 23, 1970

[21] Appl. No.: 101,121

Related U.S. Application Data

[63] Continuation-in-part of Ser. No. 690,028, Dec. 12, 1967, Pat. No. 3,553,299.

[52] U.S. Cl.................................. 264/1, 3/1, 3/13, 351/160, 351/167
[51] Int. Cl........................ B29d 11/00, B29d 11/02
[58] Field of Search ......................... 264/1; 3/1, 13; 351/160, 167; 51/284

[56] References Cited
UNITED STATES PATENTS
3,408,659   11/1968   Thiele et al................. 351/160 UX
FOREIGN PATENTS OR APPLICATIONS
918,626   2/1963   Great Britain...................... 351/160

Primary Examiner—Robert F. White
Assistant Examiner—Allen M. Sokal
Attorney—Erich M. H. Radde and Gerard J. Weiser

[57] ABSTRACT

Optical lenses useful for replacing damaged or cataractous eye lenses, contact lenses, and other aids to vision obtained from the lens nucleus substance have a high transparency and their optical characteristics such as curvatures, refractive index, and others, can be varied as required.

5 Claims, No Drawings

PROCESS OF PREPARING SHAPED OPTICAL BODIES USEFUL AS AIDS TO VISION

CROSS-REFERENCE TO RELATED APPLICATION

The present application is a continuation-in-part of copending application Ser. No. 690,028, filed Dec. 12, 1967 and entitled "PROCESS OF PRODUCING SHAPED OPTICAL BODIES USEFUL AS AIDS TO VISION AND PRODUCTS", now U.S. Pat. No. 3,553,299.

BACKGROUND OF THE INVENTION

1. Field of the Invention

The present invention relates to a process of producing aids useful in improving or restoring vision and more particularly to such aids to vision as contact lenses, lenses for optical correction of the eye and for replacement of the natural eye lens and the like, and to such products useful in improving or restoring vision.

2. Description of the Prior Art

Optical lenses, contact lenses, and other aids to vision have been made of glass and also of plastic material. Lenses made of plastic material have the advantage over glass lenses that they are substantially unbreakable. However they have the disadvantage that they are not as resistant as glass lenses to atmospheric influences and the action of cleansing agents. Like glass lenses they are products foreign to the human body and, therefore, are not well tolerated when brought in contact with the organism, i.e., the eye. It is well known, for instance, that contact lenses made of plastic material may cause considerable irritation to the eye so that frequently their use is prohibited.

SUMMARY OF THE INVENTION

It is one object of the present invention to provide a process of producing a material useful in the manufacture of aids to vision such as contact lenses, lenses to replace the damaged or otherwise impaired natural eye lens, and the like, which material is well tolerated by the human eye and is not rejected when implanted into the eye or brought in contact with the eyeball.

Another object of the present invention is to provide contact lenses made of the natural protein of the lenses of eyes of warm-blooded animals, said contact lenses having no irritating effect when contacting the eyeball.

A further object of the present invention is to provide reconstructed lenses to be implanted into the eye in place of a damaged or otherwise impaired eye lens, said reconstructed lenses not being rejected, not being reabsorbed by the human body, and not causing irritation or other side-effects.

Other objects of the present invention and advantageous features thereof will become apparent as the description proceeds.

In principle the process of producing material useful in the manufacturing of aids to vision, such as contact lenses and lenses for replacing damaged or otherwise impaired natural eye lenses, comprises the following steps:

a. Preparatory step

Human or animal eye lenses are removed histologically from the eye. They are freed of adhering vitreous body (Corpus vitreum or vitreous humor) and of ciliary ligament or body and are decapsulated, i.e., separated from their elastic capsule and suspensory ligaments. The decapsulated lenses are then mechanically separated into their outer or peripheral shells or layers and their inner nuclei (nuclei lentis), i.e., the more difficultly soluble dense inner parts of the crystalline eye lenses. Mechanical separation of the more liquid peripheral part of the lens from the more solid inner part or nucleus of the lens may, for instance, be effected by shaking the eye lenses on a coarse sieve. Such separation may also be effected by the action of suitable solvent which are capable of dissolving the outer layer and thus separating it from the nucleus. Suitable solvents are, for instance, urea, lithium thiocyanate, alkali metal hydroxide solutions, or organic solvents such as polyalcohols. Of course, only such dissolving agents and solvents can be used which do not cause any substantial denaturation of the proteins.

b. Preparations of aids to vision from the lens nucleus

1. When using the nucleus or inner part of the lens as starting material, it is carefully dehydrated under such conditions, at such temperature and pressure, and so slowly that the water is able to diffuse from the interior of the nucleus to the outside without causing the formation of cracks, fissures, or holes. Thereby it is the preferred procedure to keep the moisture differential between the gel of the nucleus and the surrounding atmosphere as low as possible. The dehydrating temperature may be between about 10°C. and about 40°C. The water content of the dehydrated nuclear part of the lens should be at least 10 percent. A water content substantially lower than 10 percent will cause the dehydrated material to become brittle and thus to break and become readily crushed on subsequent molding. The resulting dehydrated lens nucleus material has a water content between about 10 percent and about 40 percent preferably between about 10 percent and about 20 percent. It is transparent and colorless. It corresponds in its chemical composition to the protein of the crystalline lens. It is soluble, although slowly, in weak alkaline, weak acid, urea, and lithium thiocyanate solutions, and in mixtures thereof. The dehydrated material represents the raw material for reconstructing the aids to vision according to the present invention. Careful dehydration under the conditions described above does not cause irreversible change of state of the protein. As a result thereof disintegration of the structure of the lens nucleus material is avoided.

2. The dehydrated material obtained as described hereinabove is molded into the optical article of the desired shape, for instance, into the shape of contact lenses or lens replacements and others. Such shaping may be effected by means of suitable cutting or machining tools. The preferred procedure, however, is to mold the dehydrated material under pressure in suitably shaped molds. Pressure, duration of molding, and temperature during molding may be varied depending upon the composition of the respective dehydrated material and/or its water content and can readily be determined by preliminary experiments for each type of starting material and for each shape and use of the molded bodies. The molding pressure may be between about 20 kg./sq.cm. and about 50 kg./sq.cm. and the molding temperature between 20° and 70°C. The resulting transparent and clear molded articles may be shaped in such a manner that they possess the desired inner and outer curvatures, i.e., the desired refractive index. It is readily possible, for instance, to produce replacement lenses or contact lenses with the refractive index of the natural lens, namely with a refractive index of 1.38, i.e., the refractive index at the periphery of the lens, or with a refractive index of 1.41, i.e., the refractive index of the lens nucleus. Of course, it is also possible to produce transparent molded optical bodies with a refractive index of 1.47 to 1.48 from the protein of the eye lens, i.e., very near to the refractive index of the synthetic plastic material used heretofore for such aids to vision, namely the polymerized methyl methacrylate sold under the tradename "Plexiglas." Thus it is possible to produce molded optical bodies of different curvatures, refractive power, and other optical data and to keep such bodies, lenses, contact lenses, and the like in stock and on hand.

3. The resulting shaped bodies are then preferably irreversibly cross-linked. By such a treatment they are rendered resistant to aqueous solutions and liquids and to the action of the atmosphere. Such cross-linking and stabilizing may be effected by using water-soluble cross-linking agents such as short-chain aldehydes, preferably formaldehyde, or $\alpha,\omega$-dialdehydes, such as glutar dialdehyde, 1-hydroxy adipic dialdehyde ethers, and others. The aldehydes and dialdehydes are employed together with amines, preferably with polyvalent amines such as triethylene diamine and others.

The resulting shaped bodies according to the present invention can be used as optical aids to vision to replace the eye lenses when removed by operation, for instance, to restore vision lost through cataract. Biconvex lenses obtained according to the present invention are implanted immediately after operative removal of the cataractous lens. Of course, the lens capsule must remain substantially intact during operation. By selecting a biconvex lens with the required optical characteristics reconstructed according to the present invention, it is thus possible to restore vision to persons afflicted with cataract. Preferably the optical data of the lens to be removed are measured before the operation and the reconstituted lens is selected according to said data from a set of lenses of different characteristics prepared according to the present invention. If at a later time the patient with the implanted lens should become near- or far-sighted, it is readily possible to compensate for such hypo- or hyperfunctioning of the lens by operatively exchanging the improper lens by an optically correct lens which is implanted into the posterior chamber of the eye.

The bodies according to the present invention can also be produced in convex-concave shape to be fitted as contact lens to the front of the eyeball. These contact lenses may have different optical characteristics so that they can be kept in stock and can be selected as required in order to correct the respective refractive error.

DESCRIPTION OF THE PREFERRED EMBODIMENTS

The following examples serve to illustrate the present invention without, however, limiting the same thereto.

EXAMPLE 1

The lenses are removed from 50 eyes of recently slaughtered hogs under proper hygienic condition and are decapsulated. The more liquid peripheral part of said lenses is then separated from the more solid inner part or nucleus thereof by shaking on a coarse sieve. The nuclear part of the lenses is then slowly and gradually dried at a temperature of 40°C. in an atmosphere, the humidity of which is gradually reduced in such a manner that it is at any given moment only a fraction below the water content of the nuclear lens material. When proceeding in this manner and carefully drying the lens material, a dried gel of a solids content of about 80 percent which is free of cracks, fissures, and holes is obtained. The resulting dried gel in which substantially no denaturation of the protein has taken place and which contains the protein in the form of its natural oriented filamentary molecules is then molded by pressing it in a biconvex lens-shaped mold or in a concavo-convex contact lens mold at a temperature of 50°C. and under a pressure of about 35 kg./sq.cm. until a fully transparent, solid molded body of the desired optical refractive index is obtained. The resulting molded bodies are stabilized and kept in stock until used as contact lenses or for implantation in the place of operatively removed cataractous lenses.

EXAMPLE 2

Cross-linking and stabilizing of lenses as produced according to Example 1 is carried out by immersing the lens at 25°C. into a 50 percent aqueous solution of glycerol containing 0.4 percent of formaldehyde for about 6 days. The mixture of glycerol and formaldehyde is changed every 8 hours whereby the formaldehyde content is increased by 0.1 percent each time the solution is changed. The final formaldehyde solution contains about 2.0 percent of formaldehyde. Thereafter excess formaldehyde is removed, and the treated lens is kept humid.

In place of glycerol, there may be used other polyhydric alcohols such as ethylene glycol, or polyglycols while formaldehyde may be replaced by other cross-linking agents as mentioned hereinabove.

EXAMPLE 3

The eyes of hogs of good health, which are supplied fresh from the slaughter houses are washed with water. The lenses are separated from the eyes by cutting open the eyeballs without, however, cutting the intact lens capsule. The adhering vitrous body and ciliary ligaments are removed from the lens.

200 of such pretreated lenses are decapsulated by removing the elastic capsule by means of a foreceps. The decapsulated lenses are placed into 300 cc. of a saturated urea solution and are carefully agitated therein at 25°C. Thereby the outer parts or peripheral shells of the lenses are dissolved. Care must be taken that the treatment with the urea solution is discontinued before the inner lens nucleus is affected and also dissolved. The resulting lens nuclei have a diameter of 3 to 5 mm. They are removed from the urea solution and placed on a fiber-free filter paper or surgeons crepp whereby they are dried and adhering solution is removed. Dissolving the peripheral part of the lenses required from 1 to 8 hours. Washing of the lens nuclei with water must be avoided because, thereby, the nuclei lose their transparency and become opaque.

The resulting lens nuclei are placed in an air-conditioned chamber. Preferably they are placed on a smooth, non-sticky surface of "Teflon" or polyethylene. They are dried in said chamber at 25°C. whereby care is taken that the original form and shape of the nuclei is preserved and no cracks, fissures, wrinkles, or striation occur. The atmosphere in the air-conditioned chamber contains 85 percent relative humidity. In such an atmosphere the water content of the lens nuclei is reduced from its original value of 50 percent to between about 15 percent and about 20 percent. For this purpose an aqueous glycerol water mixture is placed into the air-conditioned chamber to create the required humidity therein. The dried lenses are removed from the drying chamber as soon as they have been attained a water content of 15 percent. The water content is determined by taking samples from time to time and weighing the lenses before and after drying at 105°C. until the desired water content is achieved. It is, of course, understood that all these operations are carried out under sterile conditions.

The dried transparent lens nuclei with a water content of 15 percent to 20 percent are placed into a heated concavo-convex mold and are compressed and molded therein at 70°C. for 10 minutes by exposing them to a pressure beginning at 5 kg./sq.cm. and slowly increasing the pressure to 10 kg. per sq.cm. The molds are made of polished hardened steel. Of course, other mold materials may be used. Adhesion of the molded lenses to the mold is avoided by gold plating the steel mold or by treating its surface with a non-sticky plastic material such as polyfluoro ethylene. The molding pressure may even be higher than 20 kg./sq.cm. and may be increased to 50 kg./sq.cm. and the molding temperature up to 85°C. Depending upon the molding temperature and pressure as well as upon the type and source of the lens nuclei, the molding time may be between 1 minute and 10 minutes. Molding time, temperature, and duration are adjusted in such a manner that a highly transparent homogenous contact lens of the desired refractive power is produced.

The resulting molded contact lenses are stabilized by immersing the lenses and carefully stirring them at 18°C. in a mixture of a 1 N aluminum nitrate solution and an 0.4 percent formaldehyde solution (5 : 1). Usually a treatment in said solution for 4 days is required whereby the stabilizing mixture is renewed daily.

The stabilizing effect achieved thereby is determined by placing the lenses in 0.82 percent sodium chloride solution at 40°C. Such a solution is similar in its action on the lenses to the natural tear liquid and thus serves as synthetic tear liquid. The stabilized contact lenses remain therein unchanged and transparent, even when kept in said solution for many months.

The molded and stabilized lenses are then machined and polished. Their edges are smoothened and polished by means of conventional smoothening and polishing instruments as they are used in optometry and in dentistry.

In this manner it is possible to produce different types of lenses depending upon the degree of cross-linking. Even lenses with the elasticity of rubber can be prepared by exposing them to only a slight cross-linking treatment.

Usually it is necessary to subject the contact lenses to an edge grinding and polishing treatment. Preferably the contact lenses and their edges are ground and polished in three steps. The first step is a preliminary step whereby the edges are treated, for instance, with a medium speed rotating carborundum grinding wheel at an initial speed of 2,000 rpm. The speed is then increased to 5,000 rpm. and finally to 8,000 rpm. Thereafter, the edges are polished by means of a rotating felt cone treated with pumice and water.

In the second grinding step the edges are ground with a carborundum wheel at a medium speed and subsequently at a high speed.

Final polishing is carried out by means of a rotating wool pad covered with chalk at a medium speed of rotation, which is finally increased. In this manner the edges of the molded and stabilized contact lenses made of the protein of the eye lens can be smoothened and polished. Of course, too high an increase in temperature during grinding and polishing is to be avoided.

It was found that the contact lenses according to the present invention are of a high permeability and diffusibility with respect to a number of substances. Permeability and diffusibility were determined in the following manner:

One end of a glass tube of 50 mm. length and a diameter of 10 mm. was ground and polished. The contact lens of this invention was attached to said end by means of a silicone rubber tube casing. The glass tube with the contact lens firmly attached thereto was immersed into a slightly larger container filled with distilled water. Solutions of the various substances to be tested for their diffusibility were filled into the glass tube and were allowed to diffuse through the contact lens for a predetermined period of time and the amount of ions and neutral substances which had diffused through the lens was determined. The table given on the following page illustrates the diffusion rate of a number of substances.

TABLE

DIFFUSIBILITY AFTER 24 HOURS

| Substance tested | Atomic or molecular Weight | Contact Lenses according to invention | made of Plexiglass |
|---|---|---|---|
| I Anions: | | | |
| Chlorine Cl$^-$ | 35 | + | no diffusion |
| Bromine Br$^-$ | 80 | + | |
| Iodine I$^-$ | 127 + | | |
| Phosphate HPO$_4^-$ | 96 | + | |
| Nitrate NO$_3^-$ | 62 | + | |
| II Neutral substances: | | | |
| Water | 18 | + | no diffusion |
| Hydrogen peroxide | 34 | 14% diffused | no diffusion |
| III Organic compounds: | | | |
| Vitamin C | 176 | 6% diffused | |
| Glycine | 75 | + | |
| Glucose | 180 | + | |
| Urea | 60 | + | |
| IV Dyestuffs | | | |
| Neutral Red | 289 | no diffusion | no diffusion |

The diffusion throughout the contact lenses according to the present invention is compared with the diffusion through plastic contact lenses such as Plexiglass contact lenses. It is interesting to note that the thickness of the tested contact lenses according to the present invention is 0.5 mm. while the thickness of the Plexiglass contact lenses was 0.4 mm. The diameter of both lenses was the same, namely 10 mm.

The results given in said table show clearly that all the tested substances diffuse through the contact lenses according to the present invention. In contrast thereto no, or almost no diffusion is observed when testing contact lenses made of plastic material. Of special importance is the diffusibility of Vitamin C, glycine, glucose, and urea because such compounds are of importance in the metabolism of the epithelium cells of the cornea. The test results with hydrogen peroxide show that oxygen, which has a molecular weight of 32 and which is only slightly different from the molecular weight 34 of hydrogen peroxide will also diffuse through a contact lens according to the present invention. It does not diffuse through contact lenses made of plastic material.

The diffusibility of many inorganic and organic ions and compounds through the contact lenses according to the present invention is of utmost importance, because the metabolism of the cells in the epithelium layer of the cornea is considerably improved by said diffusibility which indicates that many compounds can penetrate through the contact lens and can react with the epithelium of the cornea. The diameter of the pores in the stabilized contact lenses of the present invention are of such a size that the tested ions and compounds are capable of diffusion therethrough. However, larger molecules such as Neutral Red, viruses, and bacteria are not able to pass through the lenses. It follows from these tests that contact lenses made according to the present invention are far superior to contact lenses made of plastic material.

Of course, many changes and variations in the starting eye lens material, in the cross-linking and stabilizing agents used, in the conditions, temperature, and duration employed for forming the lenses, in the manner in which the lens material is shaped, and the like may be made by those skilled in the art in accordance with the principles set forth herein and in the claims annexed hereto.

We claim:

1. In a process of producing shaped optical bodies useful as aids to vision, the steps which comprise
   a. partly dehydrating the inner nuclear part of lenses of the eyes of warm-blooded animals and humans to a water content between about 10 percent and about 40 percent under conditions avoiding the formation of layers of a lower water content than about 10 percent and of cracks, fissures, wrinkles, striation in the resulting partly dehydrated gel,
   b. mechanically shaping said dehydrated gel to form the desired shaped optical body, and
   c. cross-linking the resulting shaped optical body to further increase the strength properties of said body.

2. The process of claim 1, wherein in step (a) dehydration is carried out in an atmosphere, the humidity of which, during dehydration, is only a fraction lower than the water content of the lens material to be dehydrated.

3. The process of claim 1, wherein mechanical shaping is effected by compressing the partly dehydrated gel obtained according to step (a) in a mold.

4. The process of claim 3, wherein the pressure applied to the gel on shaping is between about 20 kg./sq.cm. and about 50 kg./sq.cm. and the temperature during shaping is between about 20°C. and about 80°C.

5. In a process of producing shaped optical bodies useful as aids to vision, the step which comprises cross-linking a shaped optical body obtained by
   partly dehydrating the inner nuclear part of lenses of the eyes of warm-blooded animals and humans to a water content between about 10 percent and about 40 percent under conditions avoiding the formation of layers of a lower water content than about 10 percent and of cracks, fissures, wrinkles, striation in the resulting partly dehydrated gel, and
   mechanically shaping said dehydrated gel to form the desired shaped optical body,
said cross-linking increasing the strength properties of the shaped optical body.

* * * * *